US009310877B2

(12) United States Patent
Yoshida

(10) Patent No.: US 9,310,877 B2
(45) Date of Patent: Apr. 12, 2016

(54) APPARATUS AND POWER-SAVING METHOD FOR CONTROLLING A RETURN TO A NORMAL POWER MODE

(71) Applicant: Fumiyuki Yoshida, Kanagawa (JP)

(72) Inventor: Fumiyuki Yoshida, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 524 days.

(21) Appl. No.: 13/744,783

(22) Filed: Jan. 18, 2013

(65) Prior Publication Data

US 2013/0198550 A1  Aug. 1, 2013

(30) Foreign Application Priority Data

Jan. 26, 2012  (JP) .................................. 2012-014176
Jul. 27, 2012  (JP) .................................. 2012-167505

(51) Int. Cl.
  *G06F 1/00* (2006.01)
  *G06F 1/32* (2006.01)
  *G06F 1/24* (2006.01)
  *G06F 1/26* (2006.01)

(52) U.S. Cl.
  CPC ................ *G06F 1/3287* (2013.01); *G06F 1/24* (2013.01); *G06F 1/26* (2013.01)

(58) Field of Classification Search
  CPC .................................................. G06F 1/3287
  USPC .................................................. 713/324, 300
  See application file for complete search history.

(56) References Cited

U.S. PATENT DOCUMENTS

2002/0039194 A1  4/2002  Nakao et al.
2008/0141050 A1  6/2008  Senda
2010/0083020 A1  4/2010  Suzuki
2010/0262853 A1*  10/2010  Goda ............................ 713/323
2012/0124252 A1*  5/2012  Kayama ........................... 710/32
2012/0246501 A1*  9/2012  Haruki et al. ................. 713/323

FOREIGN PATENT DOCUMENTS

CN       1877494 A    12/2006
JP     2000-101712     4/2000
JP     2002199461 A    7/2002

(Continued)

OTHER PUBLICATIONS

Chinese Office Action issued Mar. 26, 2015 in corresponding Chinese Application No. 201310027399.8.

*Primary Examiner* — Thomas Lee
*Assistant Examiner* — Robert Cassity
(74) *Attorney, Agent, or Firm* — Harness, Dickey & Pierce, P.L.C.

(57) ABSTRACT

An information processing apparatus includes a main storage unit and a primary computing unit. When a power-save mode is set, power supply to the main storage unit is being continued while power supply to the primary computing unit is stopped. The primary computing unit includes an operation status information processing unit to store operation status information of the primary computing unit when shifting to the power-save mode; a storing destination information processing unit to store storing-destination information indicating a storage area of the operation status information; a power-supply stop control unit to stop power supply to the primary computing unit after storing the operation status information and storing-destination information; a return operation identifying unit to confirm return operation identification information and to initialize the primary computing unit after power supply to the primary computing unit is resumed; and an operation status restoring unit to read the operation status information.

19 Claims, 12 Drawing Sheets

(56) References Cited

FOREIGN PATENT DOCUMENTS

| JP | 2003-519830 | 6/2003 |
| JP | 2003-248580 | 9/2003 |
| JP | 2004258964 A | 9/2004 |
| JP | 2005-094679 | 4/2005 |
| JP | 2007-068156 | 3/2007 |
| JP | 200848177 A | 2/2008 |
| WO | WO 01/33322 A2 | 5/2001 |

* cited by examiner

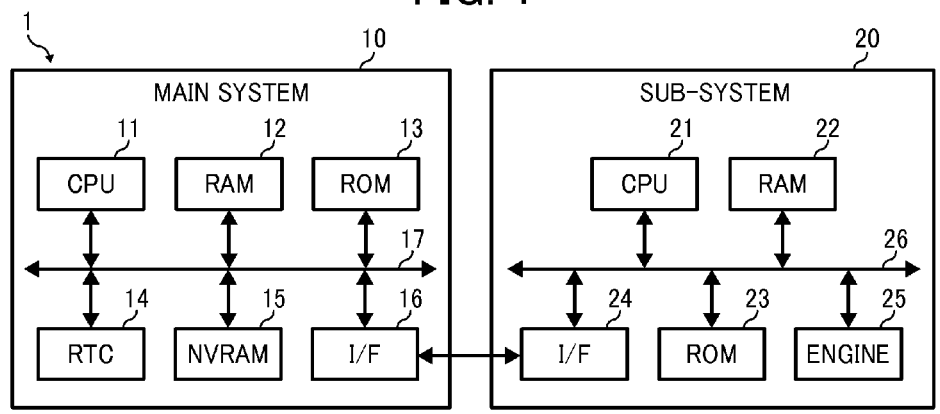
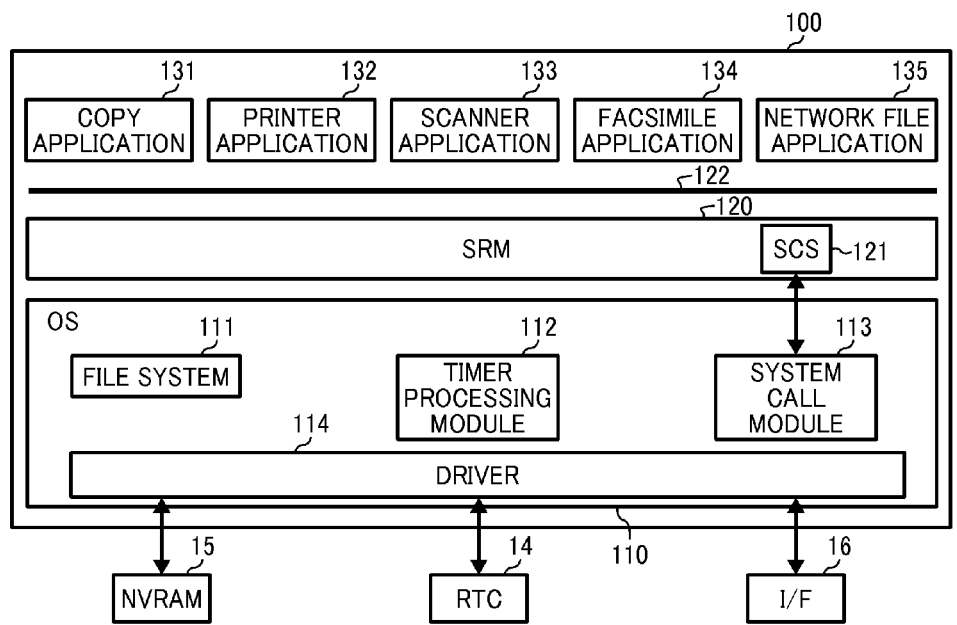

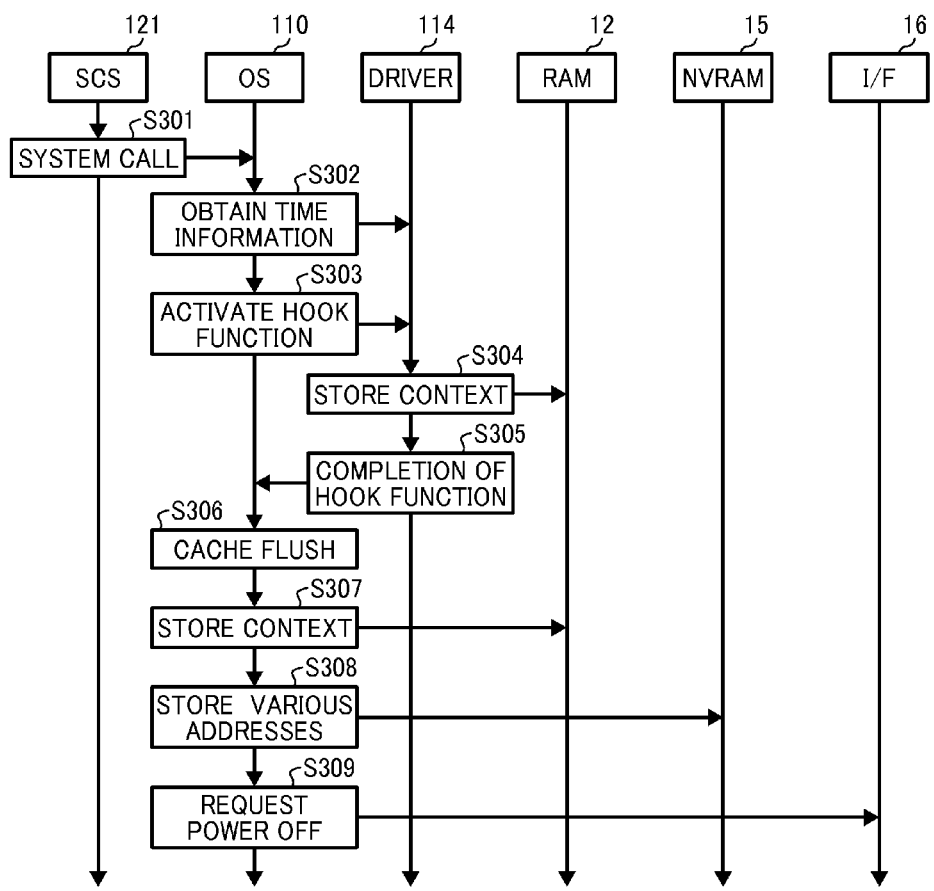
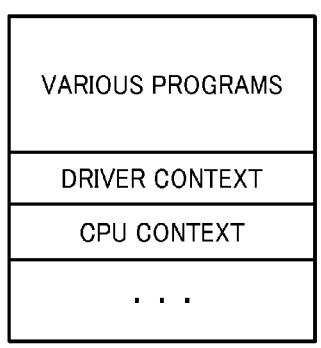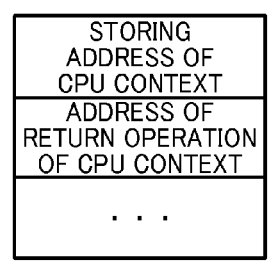

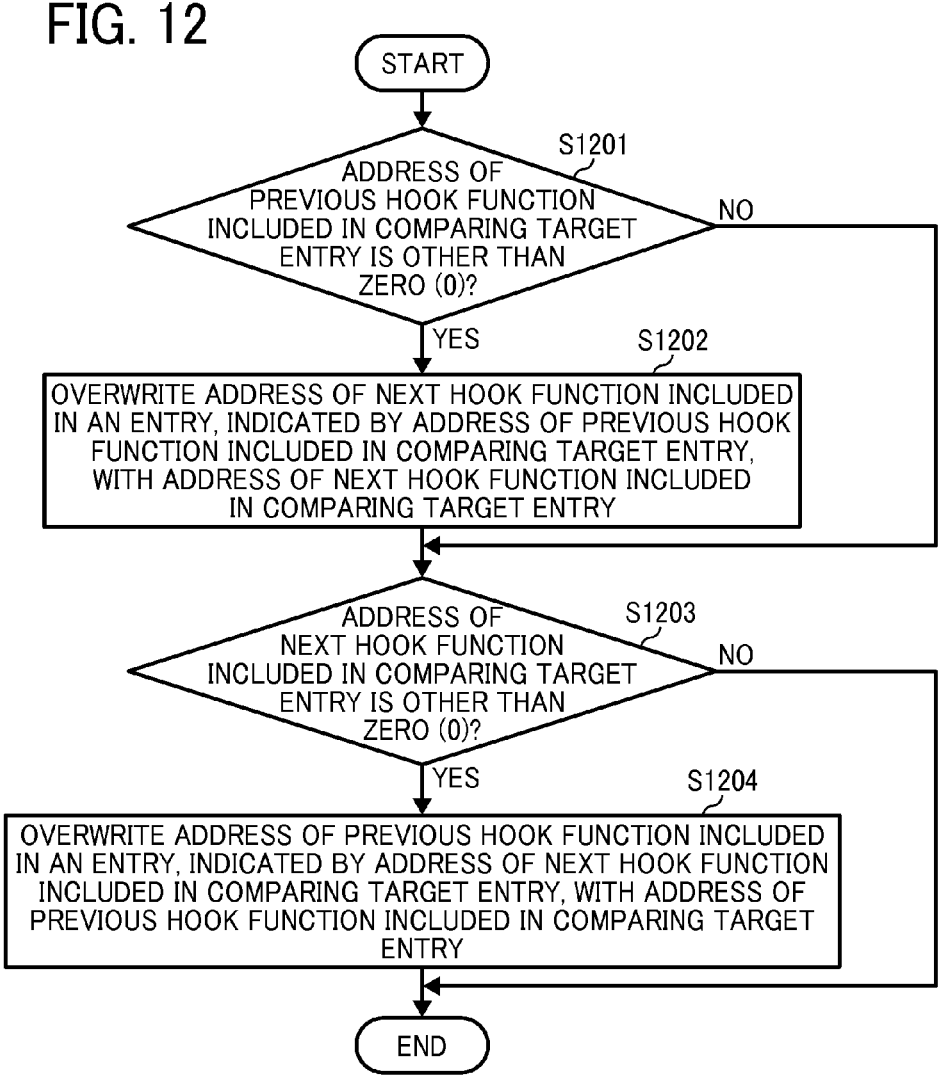

APPARATUS AND POWER-SAVING METHOD FOR CONTROLLING A RETURN TO A NORMAL POWER MODE

CROSS-REFERENCE TO RELATED APPLICATION

This application claims priority to Japanese Patent Applications Nos. 2012-014176, filed on Jan. 26, 2012, and 2012-167505, filed on Jul. 27, 2012 in the Japan Patent Office, the disclosure of which are incorporated by reference herein in their entirety.

BACKGROUND

1. Technical Field

The present invention relates to an information processing apparatus, a power-save control method, and a power-save control program, and more particularly to a control of stopping power-supply to a processor.

2. Description of the Background Art

There is a continuing market demand for saving power consumption of image processing apparatuses including a computing unit such as a central processing unit (CPU), in which power-save control function is activated to stop power-supply to each unit in the apparatuses depending on operation status of the apparatuses.

For example, as for personal computer (PC) architecture applied to information processing apparatuses employing CPU of x86 series, such power-save control can be conducted by a suspend-to-RAM (STR) mode and a suspend mode.

When the STR mode is used for the power-save mode, the power supply to a main storage such as a random access memory (RAM) is continued to retain stored data (i.e., refresh operation) while the power supply to the CPU is being stopped, and thereby the operation status of the information processing apparatus can be stored. By employing such configuration, when returning from the power-save mode to a normal operation mode, the information processing apparatus can be quickly returned to the normal operation mode, which was a mode before shifting to the power-save mode as disclosed in WO2001/033322 A2 (corresponding to published Japanese translation of PCT international publication for patent application "P2003-519830-A").

Further, the suspend mode can be employed to conduct the power-save control, in which when resetting the apparatus, it is checked whether a jump code exists. If the jump code is detected, a loader process is conducted without initializing hardware as disclosed in JP-2003-248580-A.

However, the published patent application "P2003-519830-A" discloses a technology using the STR mode adapted to PC architecture, such technology cannot be used for other information processing apparatuses employing different architectures. JP-2003-248580-A discloses a technology adapted to the suspend mode, but the power supply to the CPU is being continued when resetting software.

SUMMARY

In one aspect of the present invention, an information processing apparatus is devised. The information processing apparatus includes a main storage unit; a primary computing unit, using a processing device, when a power-save mode is set for the information processing apparatus, power supply to the main storage unit being continued while power supply to the primary computing unit is stopped; an operation status information processing unit, using the primary computing unit, to store operation status information indicating operation status of the primary computing unit in the main storage unit when shifting to the power-save mode; a storing destination information processing unit, using the primary computing unit, to store storing-destination information indicating a storage area of the operation status information in the main storage unit to a secondary storage unit different from the main storage unit; a power-supply stop control unit, using the primary computing unit, to stop power supply to the primary computing unit after storing the operation status information and the storing-destination information; a return operation identifying unit, using the primary computing unit, to confirm return operation identification information set by a secondary computing unit using another processing device, upon detecting a return-initiating event for returning from the power-save mode, and then the return operation identifying unit to conduct an initialization process of the primary computing unit after power supply to the primary computing unit is resumed; and an operation status restoring unit, using the primary computing unit, to read out the operation status information stored in the main storage unit based on the storing-destination information stored in the secondary storage unit when the return operation identification information is confirmed.

In another aspect of the present invention, a method of power-save control for an information processing apparatus having a main storage unit and a primary computing unit is devised. The information processing apparatus is shift-able to a power-save mode continuing power supply to the main storage unit while stopping power supply to the primary computing unit. The method includes 1) storing operation status information indicating operation status of the primary computing unit in the main storage unit when shifting to the power-save mode; 2) storing storing-destination information indicating a storage area of the operation status information in the main storage unit to a secondary storage unit different from the main storage unit; 3) stopping power supply to the primary computing unit after storing the operation status information and the storing-destination information; 4) confirming return operation identification information set by a secondary computing unit that detects a return-initiating event for returning from the power-save mode when conducting initialization process of the primary computing unit after supplying power to the primary computing unit; and 5) reading out the operation status information by referring the storing-destination information stored in the secondary storage unit when the return operation identification information is confirmed.

In another aspect of the present invention, a non-transitory computer-readable storage medium storing a program that, when executed by a computer, causes the computer to execute a method of power-save control for an information processing apparatus having a main storage unit and a primary computing unit is devised. The information processing apparatus is shift-able to a power-save mode continuing power supply to the main storage unit while stopping power supply to the primary computing unit. The method includes 1) storing operation status information indicating operation status of the primary computing unit in the main storage unit when shifting to the power-save mode; 2) storing storing-destination information indicating a storage area of the operation status information in the main storage unit to a secondary storage unit different from the main storage unit; 3) stopping power supply to the primary computing unit after storing the operation status information and the storing-destination information; 4) confirming return operation identification information set by a secondary computing unit that detects a return-initiating event for returning from the power-save mode when conducting initialization process of the primary computing unit after supplying power to the primary computing unit; and 5) reading out the operation status information by referring the storing-destination information stored in the secondary storage unit when the return operation identification information is confirmed.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 1 shows a block diagram of a hardware configuration of an information processing apparatus according to an example embodiment;

FIG. 2 shows a software-implemented configuration of a main system according to an example embodiment;

FIG. 3 shows a sequence diagram of shift from a normal mode to a suspend mode for the information processing apparatus of FIG. 1;

FIGS. 4(a) and 4(b) show information stored in storages according to an example embodiment;

FIG. 11 shows an example of an activation priority table according to another example embodiment;

FIG. 12 shows a flowchart of steps of operation of retrieving a comparing target entry from queue sequence of Hook functions according to another example embodiment;

Figure 5:
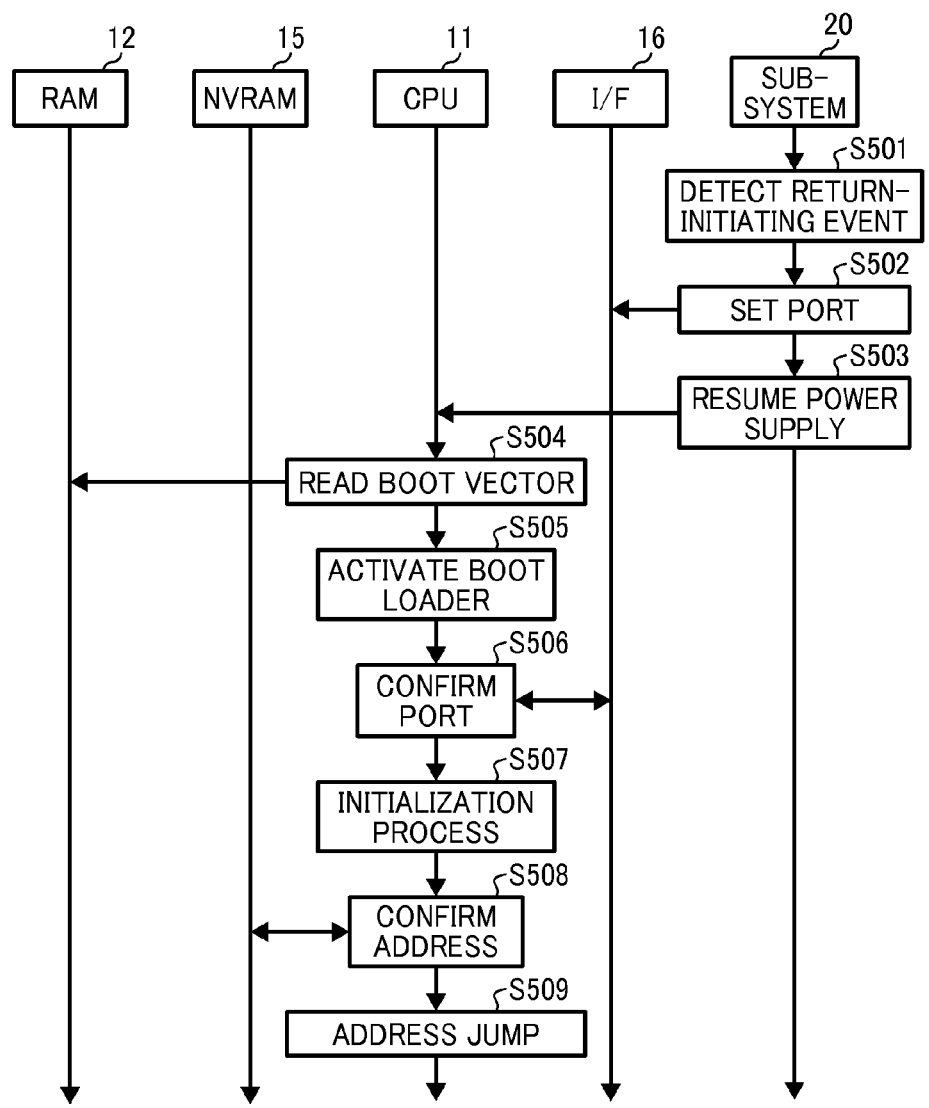
FIG. 5 shows a sequence diagram of a return operation from a suspend mode according to an example embodiment.

The accompanying drawings are intended to depict exemplary embodiments of the present invention and should not be interpreted to limit the scope thereof. The accompanying drawings are not to be considered as drawn to scale unless explicitly noted, and identical or similar reference numerals designate identical or similar components throughout the several views.

DETAILED DESCRIPTION OF EXEMPLARY EMBODIMENTS

A description is now given of exemplary embodiments of the present invention. It should be noted that although such terms as first, second, etc. may be used herein to describe various elements, components, regions, layers and/or sections, it should be understood that such elements, components, regions, layers and/or sections are not limited thereby because such terms are relative, that is, used only to distinguish one element, component, region, layer or section from another region, layer or section. Thus, for example, a first element, component, region, layer or section discussed below could be termed a second element, component, region, layer or section without departing from the teachings of the present invention.

In addition, it should be noted that the terminology used herein is for the purpose of describing particular embodiments only and is not intended to be limiting of the present invention. Thus, for example, as used herein, the singular forms "a", "an" and "the" are intended to include the plural forms as well, unless the context clearly indicates otherwise. Moreover, the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Furthermore, although in describing views shown in the drawings, specific terminology is employed for the sake of clarity, the present disclosure is not limited to the specific terminology so selected and it is to be understood that each specific element includes all technical equivalents that operate in a similar manner and achieve a similar result.

(First Example Embodiment)

A description is given of an information processing according to an example embodiment apparatus with reference to the drawings. Such information processing apparatus may be a multi-functional peripheral (MFP) having a plurality of functions such as printer, scanner, and facsimile, but not limited thereto.

FIG. 1 shows a block diagram of an information processing apparatus 1 according to an example embodiment. As shown in FIG. 1, the information processing apparatus 1 includes, for example, a main system 10 and a sub-system 20, which can be connected with each other using an interface.

The main system 10 can be used as a controller for the information processing apparatus 1 as whole. The main system 10 includes, for example, a central processing unit (CPU) 11, a random access memory (RAM) 12, a read only memory (ROM) 13, a real time clock (RTC) 14, a non-volatile RAM (NVRAM) 15, and an interface (I/F) 16, which can be connected with each other using a bus 17.

Further, the sub-system 20 can be used as an engine system for implementing functions available for the information processing apparatus 1. The sub-system 20 includes, for example, a CPU 21, a RAM 22, a ROM 23, an I/F 24, and an engine 25, which can be connected with each other using a bus 26. Further, the sub-system 20 has a function to shift an apparatus mode to a power-save mode that stops the power-supply to the CPU 11 of the main system 10, and a function to detect a return-initiating event when the power-supply to the CPU 11 of the main system 10 is being stopped.

The CPUs 11 and 21 are computing units, which mainly control the operation of the main system 10 and the sub-system 20 respectively. As above described, the CPU 21 has a function to detect the return-initiating event when the power-supply to the CPU 11 is being stopped (i.e., during power-save mode). Therefore, the CPU 21 is designed to consume less power compared to the CPU 11. In this disclosure, the CPU 11 may be referred to as a primary computing unit, and the CPU 21 may be referred to a secondary computing unit.

The RAMs 12 and 22 are volatile storage media used for high speed reading and writing of information, and can be used as working memories of the CPUs 11 and 21 when processing information. The ROMs 13 and 23 are read only non-volatile storage media storing programs such as firmware or the like.

Further, the ROMs 13 and 23 store a boot vector to which the CPUs 11 and 21 access upon supplied with power. The boot vector stores a boot loader program, which conducts the initialization process of the CPUs 11 and 21 when power is supplied to the CPUs 11 and 21. In such a configuration, the boot loader is activated when the CPUs 11 and 21 are supplied with power.

The RTC 14 is a timer that counts time information such as actual time and date. The NVRAM 15 is a non-volatile storage medium used for reading and writing information, and temporarily stores information required for an operation of apparatus. The I/Fs 16 and 24 are interfaces used for communicating information between the main system 10 and the sub-system 20 such as for example peripheral component interface Express (PCIe) interface, but not limited thereto.

The engine 25 is used to implement functions available for the information processing apparatus 1. The engine 25 includes, for example, a scanner device to scan images, a plotter device to form and output images, a facsimile device to conduct facsimile communication via public phone lines, and a network device to conduct a network communication using transmission control protocol/internet protocol (TCP/IP). Further, the engine 25 can include a configuration to control the power supply to the CPU 11.

In such a hardware configuration, programs stored in the ROMs 13 and 23, or a storage medium such as a hard disk drive (HDD) and an optical disk are read on the RAMs 12 and 22, and then the CPUs 11 and 21 conducts computing based on the programs, by which a software-based controller can be configured. By combining the such software-based controller and hardware, a functional block that can devise the functions of the information processing apparatus 1 according to an example embodiment can be configured.

A description is given of a software-implemented configuration of the main system 10 of the information processing apparatus 1 with reference to FIG. 2. As shown in FIG. 2, the main system 10 includes, for example, software 100 configured with a plurality of applications, and a platform.

Such applications include, for example, a copy application 131, a printer application 132, a scanner application 133, a facsimile application 134, and a network file application 135, but not limited thereto.

The copy application 131 activates the information processing apparatus 1 as a copier. The printer application 132 activates the information processing apparatus 1 as a printer. The scanner application 133 activates the information processing apparatus 1 as a scanner.

The facsimile application 134 activates the information processing apparatus 1 as a facsimile machine. The network file application 135 includes, for example, a web server software to distribute hyper text markup language (HTML) file, and a web browser to browse HTML file or the like, and activates the information processing apparatus 1 as a network server and a network client.

The software 100 includes such applications, and also a platform to execute information processing requested by the applications to the hardware. The reception of processing request from the applications may be conducted using an application-programming interface (API) 122 that includes pre-defined functions.

The platform includes, for example, a system resource manager (SRM) 120 including control service such as a system control service (SCS) 121, and an operating system (OS) 110.

The control service such as SCS 121 interprets process requested by applications to hardware, and generates a request of obtaining hardware depending on interpretation result. The SCS 121 controls process of system management such as shifting to power-save mode or the like.

The SRM 120 manages requests of obtaining a specific hardware, and controls an implementation of process requesting a use of specific hardware depending on managed results. Specifically, the SRM 120 determiners whether a concerned hardware, requested to use by an obtaining request, can be used. For example, when two different obtaining requests request a use of specific hardware, the SRM 120 determiners which competing requests can use such specific hardware. If it is determined that the hardware can be used based on such management process, the SRM 120 reports that the hardware is available for use to the SCS 121, which is used as a control service. Further, the SRM 120 prepares availability schedule of hardware devices related to obtaining requests, and controls an implementation of process requesting a use of specific hardware device depending on the availability schedule.

The OS 110 manages the hardware based on the above-mentioned managed result. As shown in FIG. 2, the OS 110 includes, for example, a file system 111, a timer processing module 112, a system call module 113, and a driver 114. The file system 111 conducts a file management for the information processing apparatus 1. The timer processing module 112 is a module to execute registered timer processing, which may include a plurality of timer processing. The system call module 113 is a module to conduct the power-save control of the OS 110.

The driver 114 is a software module to drive the hardware. The driver 114 may include Hook functions, which can be used to store context such as register value corresponding to each hardware in the RAM 12. Although the driver 114 shown in FIG. 2 is shown as one block for the simplicity of drawing, a plurality of drivers can be set respectively for a plurality of hardware devices.

In the above described configuration according to an example embodiment, the power-save mode (or suspend mode) can be applied by stopping power supply to the CPU 11 while the power supply to the RAM 12 is being continued in the main system 10. A description is given of an operation of the information processing apparatus 1 according to an example embodiment.

FIG. 3 shows a sequence diagram of shift from a normal mode to a suspend mode for the information processing apparatus 1 according to an example embodiment. As shown in FIG. 3, when shifting to the suspend mode, the SCS 121 calls the system call module 113 of the OS 110 based on a request from application or a request by a user operation (S301).

When the system call module 113 is activated, the OS 110 obtains information of present or current time by receiving the information of present or current time from the RTC 14 via the driver 114 (S302). As such, at S302, the system call module 113 can be used as a pre-sift time processing unit which receives present time information before shifting to the suspend mode, and stores such present time information in a memory such as the RAM 12 and/or the NVRAM 15. Such present time information before shifting to the suspend mode may be referred to first present time information for the simplicity of description.

Upon receiving the first present time information, the system call module 113 activates a Hook function installed in the driver 114 (S303). Based on processing by the Hook function activated at S303, the driver 114 stores context such as a register value of driver (hereinafter, driver context) in the RAM 12 (S304).

The driver context is used as device operation status information indicating an operation status of each device controlled by the driver 114. As such, at S304, the driver 114 can function as a device operation status information processing unit by using the Hook function.

The driver context stored at S304 is a parameter, which is used to operate each driver, and such parameter is, typically, the above-mentioned register value. Further, as described with FIG. 2, because the driver 114 can be disposed for each of the plurality of hardware devices, the process at S304 may be conducted for each driver.

Upon completing the storing of the context using the Hook function, the driver 114 reports the completion of Hook function to the system call module 113 of the OS 110 (S305). Upon receiving the completion of the Hook function, the system call module 113 conducts cache flush (S306), and stores context for operating the CPU 11 (hereinafter, CPU context) to the RAM 12 (S307).

The CPU context is used as operation status information indicating operation status of the CPU 11 such as register value and translation lookaside buffer (TLB) of the CPU 11. At S307, the system call module 113 can function as an operation status information processing unit that stores such operation status information to the RAM 12.

Further, the CPU context includes a return address from a function used for storing the CPU context. The return address is an address on the RAM 12 that stores program codes describing a given process after storing CPU context on the RAM 12, wherein the storing of CPU context is one of the processes conducted by the system call module 113. The return address is stored in a register of the CPU 11 when a function to execute the process of S307 is called, and the return address is included in the CPU context as a register value.

As a process continuing from the process at S307, the system call module 113 stores an address indicating a storing area of the CPU context stored in the RAM 12 at S307, and stores an address corresponding to a return operation of the CPU context to the NVRAM 15 (S308). Address is used as storing destination information. As such, at S308, the system call module 113 can function as a storing destination information processing unit that stores storing-destination information indicating a destination of storing operation status information in the NVRAM 15.

Further, as a process continuing from S307, after completing S308, the system call module 113 requests power-OFF of the CPU 11 to the sub-system 20 via the I/F 16 (S309). As such, at S309, the system call module 113 can function as a power-supply stop control unit that stops the power supply to the CPU 11 used as the primary computing unit. Based on such processing, in the sub-system 20, the CPU 21 conducts computing using programs loaded on the RAM 22 to control the engine 25, by which the power supply to the CPU 11 of the main system 10 is stopped, and the mode is shifted to the suspend mode.

The above described steps S307 to S309 can be conducted as consecutive processing by using, for example, one function or functions linked for processing steps S307 to S309, and then the apparatus shifts to the suspend mode. Therefore, the above described return address is an address that is to be referred after returning from the suspend mode.

Even if the mode is shifted to the suspend mode by such processing, information or data stored in the RAM 12 can be retained because the RAM 12 is being supplied with power. Further, because the NVRAM 15 is a non-volatile storage medium, information or data stored in the NVRAM 15 can be retained. FIGS. 4(*a*) and 4(*b*) show examples of information or data stored in the RAM 12 and the NVRAM 15 when the suspend mode is set.

FIG. 4(*a*) shows information storable in the RAM 12 when the suspend mode is set. When the suspend mode is set, the RAM 12 is stored with various programs loaded for operating the CPU 11, the driver context stored at S304, and the CPU context stored at S307 as shown in FIG. 4(*a*).

FIG. 4(*b*) shows information or data storable in the NVRAM 15 when the suspend mode is set. When the suspend mode is set, the NVRAM 15 stores a storage address of the CPU context and an address of return operation of the CPU context stored at S308 as shown in FIG. 4(*b*).

The storage address of CPU context shown in FIG. 4(*b*) corresponds to an address of the CPU context stored in the RAM 12 shown in FIG. 4(*a*). Further, the address of return operation of the CPU context shown in FIG. 4(*b*) corresponds to an address that stores program codes describing the return operation from the suspend mode for the system call module 113 of the OS 110, wherein such program is one of programs stored in the RAM 12.

A description is given of the return operation from the suspend mode with reference to FIG. 5, which shows a sequence diagram of the return operation from the suspend mode, in which upon supplying power by using the sub-system 20, the computing process by the CPU 11 is shifted to the system call module 113 of the OS 110.

As shown in FIG. 5, when the sub-system 20 detects a return-initiating event during the suspend mode (S501), the sub-system 20 writes a value indicating a return from the suspend mode (hereinafter, return operation flag) at a port of the I/F 24. Upon detecting the return-initiating event, the return operation flag is set as return operation identification information. At S501, a software module implemented by executing a given program by the CPU 21 (i.e., secondary computing unit) can function as a return-initiating event detection unit.

Then, the return operation flag is set at a port of the I/F 16 via the I/F 24 of the sub-system 20 (S502). Upon setting the return operation flag at the I/F 16, the engine 25 of the sub-system 20 controls resuming of power supply to the CPU 11 (S503). As such, at steps S502 and S503, a software module implemented by executing a given program by the CPU 21 (i.e., secondary computing unit) can function as a power-supply processing unit.

When the power-supply to the CPU 11 is resumed by using a function of the sub-system 20, the CPU 11 reads out a boot loader from a boot vector, and loads the boot loader to the RAM 12 (S504), by which the boot loader is activated (S505).

Upon activating the boot loader, the CPU 11 used as the boot loader checks the return operation flag set at the port of the I/F 16 (S506) to recognize that the return operation from the suspend mode is to be conducted. As such, at S506, the CPU 11 used as the boot loader can function as a return operation identifying unit.

Upon confirming the return operation from the suspend mode, the CPU 11 conducts the initialization processing for operation (S507) such as initialization of CPU register, initialization of RAM controller, and initialization of CPU cache, and confirms the address of return operation of CPU context (FIG. 4(*b*)) based on information stored in the NVRAM 15 (S508). Then, the CPU 11 jumps to the confirmed address (S509), and shifts to an operation by the system call module 113.

Figure 6:
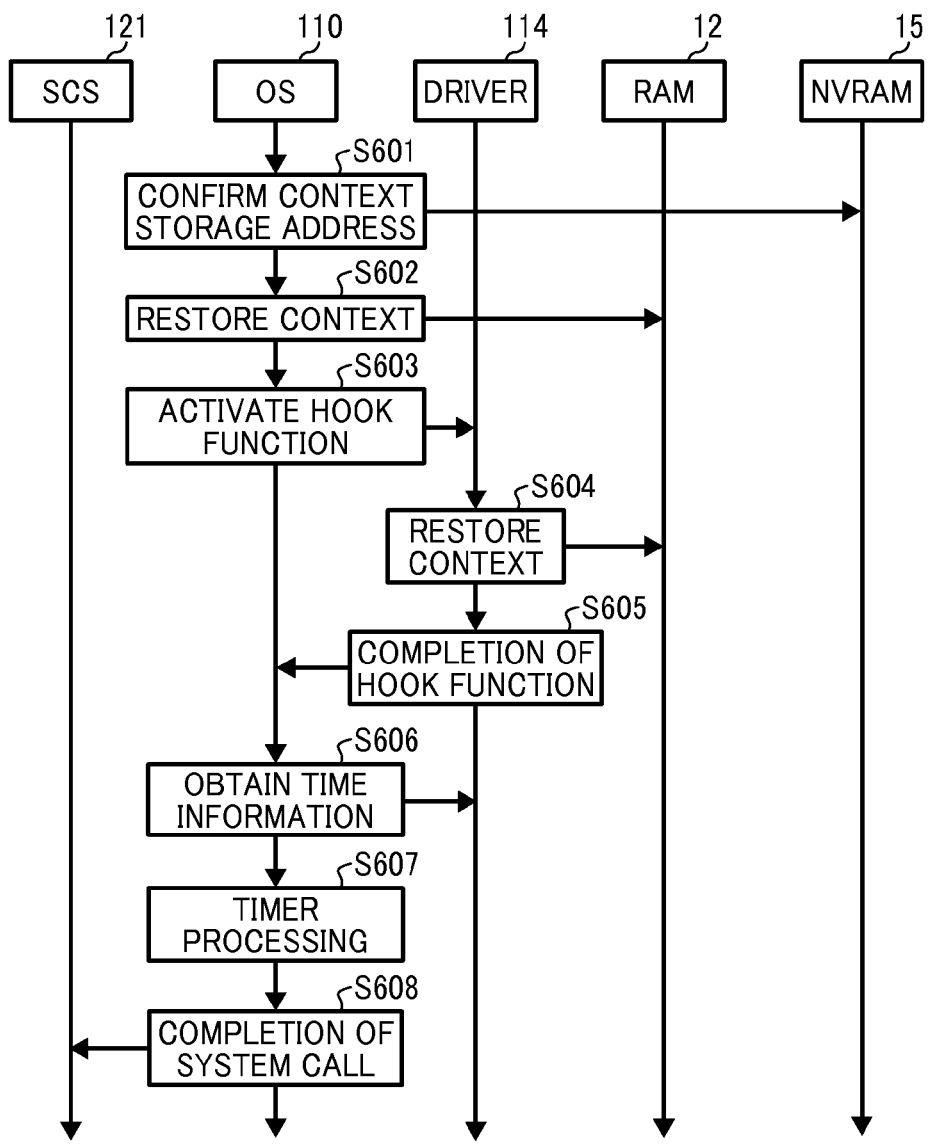
FIG. 6 shows a sequence diagram of a return operation from a suspend mode according to an example embodiment.

FIG. 6 shows a sequence diagram of the process when returning from the suspend mode, in which the operation of the system call module 113 is described. As shown in FIG. 6, after jumping to the address by using the boot loader, the system call module 113 of the OS 110 starts its operation. Specifically, the system call module 113 confirms the storage address of CPU context (FIG. 4(b)), which is one of data stored in the NVRAM 15 (S601). Then, the system call module 113 accesses the RAM 12 based on the confirmed storage address of CPU context to restore the CPU context (S602), in which the CPU context can be used as operation restoring information for restoring the operation status of CPU.

As such, at S602, the system call module 113 can function as an operation status restoring unit. Further, the address of return operation of CPU context referred at S508 (FIG. 5) can be used as operation restoring unit designation information indicating a storage area storing program codes for the system call module 113, wherein the CPU 11 can function as the operation status restoring unit by executing such program codes.

Figure 7:
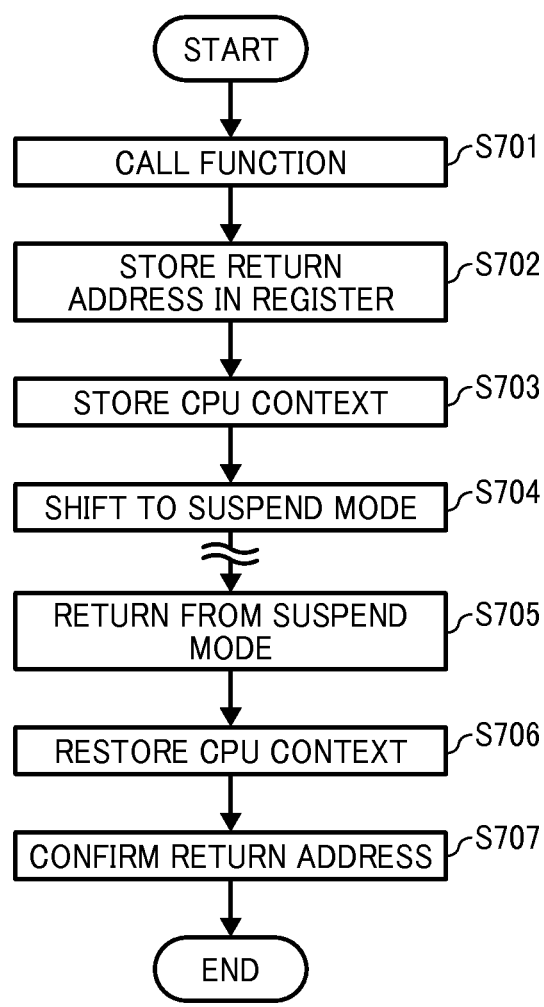
FIG. 7 shows a flowchart of steps of a storing operation of CPU context and a restoring operation of CPU context according to an example embodiment.

A description is given of storing process of CPU context (S307: FIG. 3) and the restoring operation of CPU context (S602: FIG. 6) with reference to FIG. 7, which shows a flowchart of operation for storing and restoring the CPU context. As shown in FIG. 7, when a function to execute the processing at S307 to S309 is called (S701), the CPU 11 stores the return address in a register (S702).

Then, the CPU context is stored in a memory such as RAM 12 by the process at S307 (S703), and the mode is shifted to the suspend mode by the process at S309 (S704). Then, at a given timing, the mode can be returned from the suspend mode in response to the return-initiating event (S705), and the processing of S501 to S509 (FIG. 5) are conducted. Further, the processing of S601 and S602 (FIG. 6) are conducted to restore the CPU context (S706). With such processing, the control status or operation status of the CPU 11 can be restored to a control status or operation status that was used before shifting to the suspend mode.

The CPU context restored by the process of S706 includes a register value, and such register value includes the above-described return address. Upon restoring the CPU context, the CPU 11 confirms the return address for the subsequent process based on the register value (S707).

As shown in FIG. 7, when the return address is confirmed by restoring the CPU context, the CPU 11 executes processing using program codes stored in the memory subsequently from the return address. Such return address is an address returning from a function of the system call module 113, and the system call module 113 of the OS 110 conducts given processing.

As for the processing after confirming the return address, the system call module 113 of the OS 110 activates a given Hook function installed in the driver 114 (S603). Based on a process conducted by the Hook function activated at S603, the driver 114 reads out the driver context such as the register value from the RAM 12, and restores the driver context (S604). With such processing, the control status of each hardware device controlled by the driver 14 can be restored to a status before shifting to the suspend mode. As such, at S604, the driver 114 or the CPU 110 that conducts processing using the Hook function can function as a device operation status restoring unit. As such, the Hook function can cause the CPU 110 (i.e., primary computing unit) to function as the device operation status restoring unit, and the Hook function can be referred as device operation status restoring information, which may be stored in a storage area in the CPU 110. Further, the above described return address can be used as device operation status restoring unit designation information indicating a storage area of program codes that causes the CPU 11 to function as the device operation status restoring unit.

Upon completing the restoration of context by the Hook function, the driver 114 reports the completion of the Hook function to the system call module 113 of the OS 110 (S605). Upon receiving the completion of the Hook function, the system call module 113 obtains information of present or current time by receiving information of present or current time from the RTC 14 via the driver 114 (S606) as second present time information.

Upon receiving the second present time information at S606, the system call module 113 subtracts the first present time information stored at S302 (see FIG. 3) from the second present time information at S606 (FIG. 6) to compute a time period which has elapsed as the suspend mode (hereinafter, referred to time period shifted to STR, as required). An elapsed time period is set to a monotonic timer (i.e., simple incrementing timer) of the OS 110, and activates the timer processing module 112 (S607). With such setting, even if the time-out occurs during the suspend mode for one timer processing, such timer processing can be activated properly. As such, at S606 and S607, the system call module 113 can function as a post-return time processing unit. The time-out means that a given process that is set to be executed is not executed in the set time period.

Figure 8:
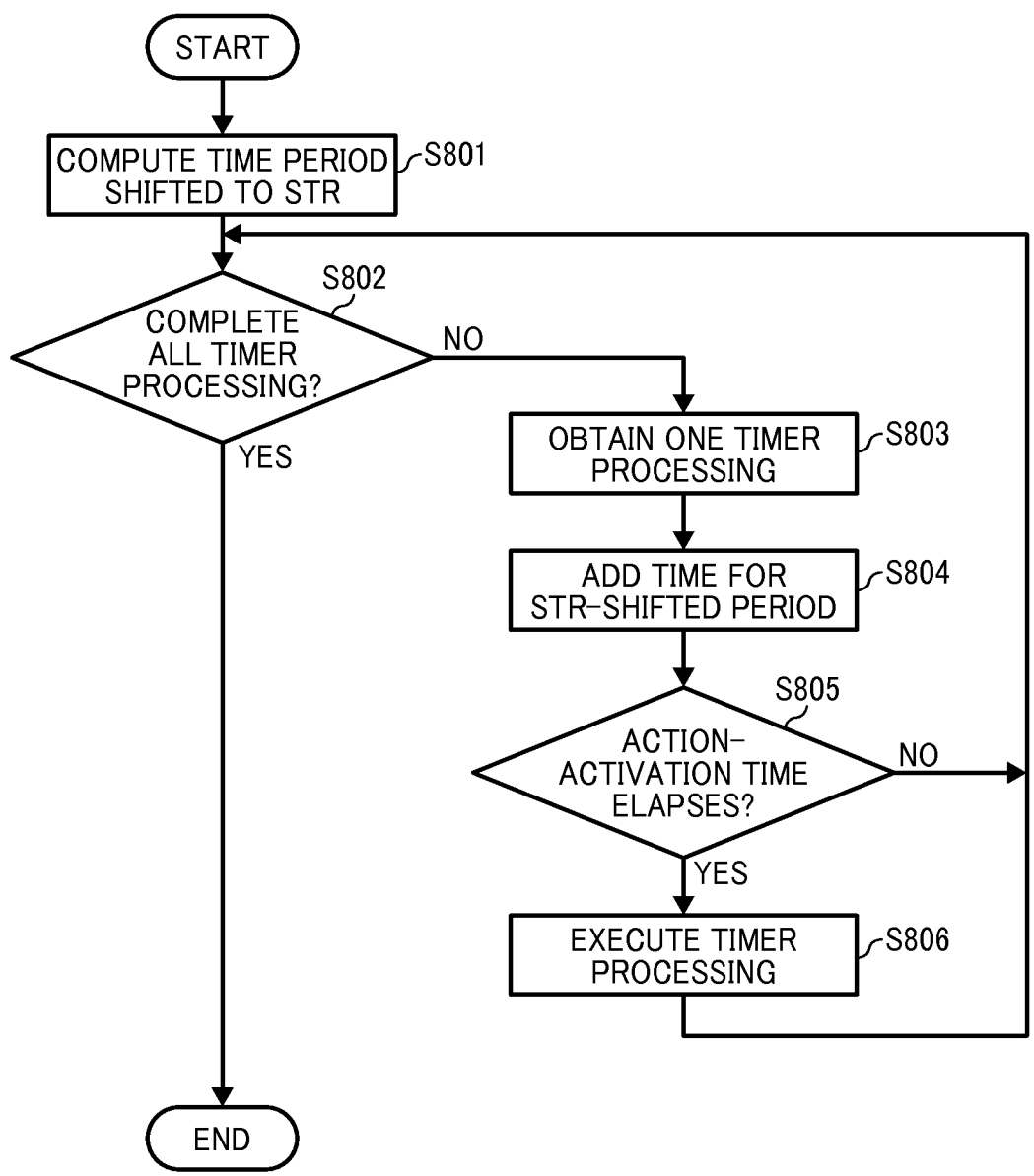
FIG. 8 shows a flowchart of timer processing according to an example embodiment.

A description is given of the detail of S607 with reference to FIG. 8. As shown in FIG. 8, upon computing the time period shifted to suspend-to-RAM (STR) (S801), the system call module 113 determines whether all of timer processing set for the timer processing module 112 are completed or not (S802).

If it is determined that all of timer processing are not completed (S802: NO), the system call module 113 obtains a timer processing from the timer processing module 112 (S803), and adds time to a count value by the timer in view of the time of STR-shifted period (S804). If the result of S804 indicates that action-activation time of the timer elapses (S805: YES), the system call module 113 instructs the timer processing module 112 to execute the timer processing (S806), and repeats the process from S802.

In contrast, if the result of S804 indicates that action-activation time of the timer does not elapse or pass over (S805: NO), the system call module 113 repeats the process from S802. By repeating such processing, the processing of S803 to S806 can be completed for all timer processing (S802: YES), and then the process ends. By conducting such processing, even if an action-activation time of a timer processing passes over during the suspend mode, such timer processing can be executed. As such, all of timer processing can be executed without missing even one timer processing.

Upon completing the process up to S608, the system call module 113 reports the completion of the system call to the SCS 121 (S608), by which the processing of system call started at S301 (FIG. 3) is completed, and the information processing apparatus 1 can be returned to a mode before shifting to the suspend mode.

In an example embodiment, while the power supply to the CPU 11 of the main system 10 that controls an operation of the entire apparatus is stopped, the CPU 21 of the sub-system 20, which controls operation of each function, can detect the return-initiating event, by which the return operation from the suspend mode can be stared. Once the power supply to the CPU 11 is resumed, the CPU 11 executes the process preset by the boot loader. However, in general, after returning from the suspend mode, it may be difficult to set an operation status, which was conducted just before shifting to the suspend mode, as an operation status after returning from the suspend mode, which means the transferring the same operation status before and after the suspend mode may be difficult.

In view of such issues, when resuming the power supply to the CPU 11, the sub-system 20 sets a flag indicating a return operation from the suspend mode is to be conducted at a port of the I/F 24. Then, by using the boot loader, the CPU 11 confirms a port of the I/F 16 used for information communication with the sub-system 20. Therefore, when the power supply is resumed, the CPU 11 executes processing using the boot loader, then the CPU 11 can recognize that the current process is the return operation from the suspend mode, and can execute processing for the return operation.

Further, before shifting to the suspend mode, the CPU context is stored in the RAM 12, and the address of CPU context, stored in the RAM 12, and the address of program codes describing the restoring operation of CPU context can be stored in the NVRAM 15 by using a function of the system call module 113 of the information processing apparatus 1.

Upon recognizing the return operation from the suspend mode, in the process conducted by using the boot loader, the process jumps to the address of program codes describing the above restoring operation, and the return operation of the CPU context can be executed. With such processing, an operation status conducted just before shifting to the suspend mode can be set as an operation status after returning from the suspend mode, by which the transferring the same operation status before and after the suspend mode can be conducted.

Because general CPU context includes TLB, the CPU 11 cannot access the RAM 12 with the same status, set before shifting to the suspend mode, until the CPU context is restored. In an example embodiment, such issue can be solved by storing the storage address of CPU context in the NVRAM 15.

Further, when the storing process of CPU context to the RAM 12 is started using a given function, a return address from such function is stored as a register value and stored as CPU context. Therefore, when the CPU context is restored, a process described by program codes, which is stored subsequently to the return address, can be executed. With such processing, an operation status conducted just before shifting to the suspend mode can be set as an operation status after returning from the suspend mode more accurately.

In the above described power-save control according to an example embodiment, the power supply to the RAM 12 used as the main storage unit is being continued while the power supply to the CPU 11 used as the primary computing unit is stopped for any types of architectures of information processing apparatuses.

FIG. 1 shows a configuration that the main system 10 and the sub-system 20 are separated with each other, and such configuration is a typical configuration for multi-functional apparatuses having a plurality of image processing functions such as scanners, printer, and copiers. Therefore, the power-save control method according to an example embodiment can be applied for the multi-functional apparatus without too much change of apparatus design. Further, the power-save control method according to an example embodiment can be applied to any information processing apparatuses using the main system 10 and the sub-system 20 shown in FIG. 1 with the similar effect.

(Second Example Embodiment)

In the above-described first example embodiment, the Hook function installed in the driver 114, corresponded to each hardware unit, is activated to store the driver context at S303 (FIG. 3), and the CPU context is restored at S602 (FIG. 6). Then, the process starts by referring the return address, and the Hook function is activated to restore the driver context.

In the above-described first example embodiment, when the restoring operation of driver context is to be conducted by Hook function after starting the process by referring the return address, the sequence order for restoring operation may need to be examined. Specifically, when restoring the driver context of device connected to a PCIe interface, the restoring of the driver context of device needs to be conducted after restoring the status of PCIe interface because the restoring of the driver context of device can be conducted correctly only when the PCIe interface is operated correctly. If the restoring of the device is conducted at first, and then the restoring of the PCIe interface is conducted, the bus lock occurs and then the apparatus operation is stopped.

A description is given of second example embodiment that the activation sequence of Hook functions is adjusted to prevent such problem.

Figure 9:
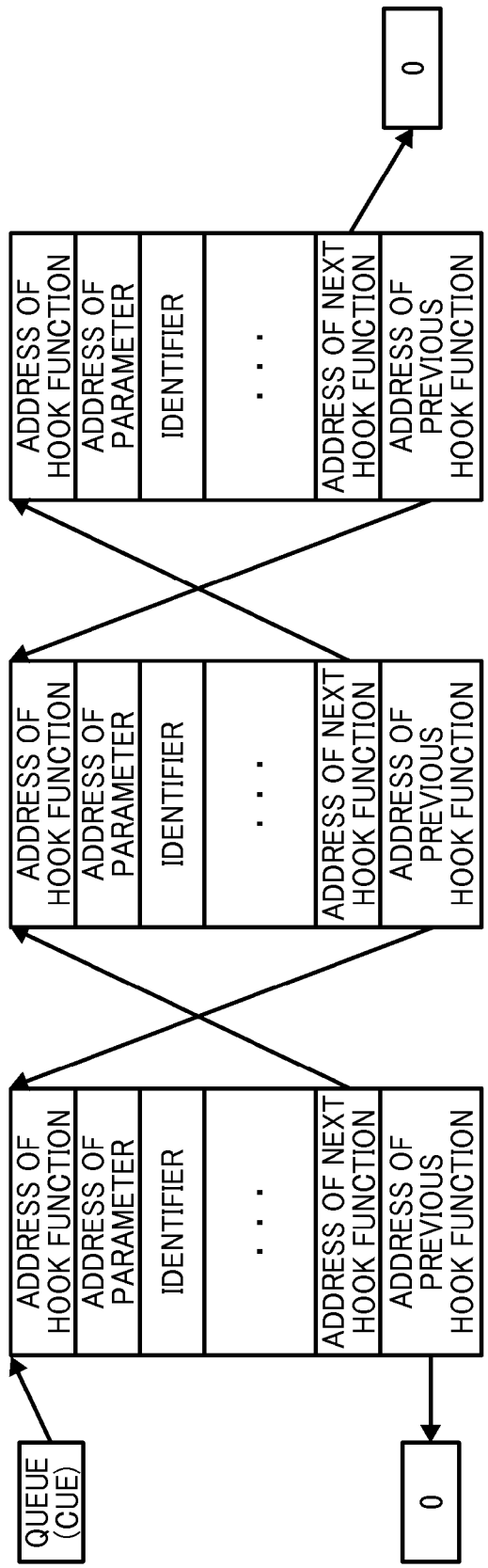
FIG. 9 schematically shows queue sequence of Hook functions according to another example embodiment.

FIG. 9 schematically shows entries having specific Hook functions operable in view of a queue sequence of Hook functions. The entry information shown in FIG. 9 can be stored in a storage area in the RAM 12 under the control of the system call module 113. The CPU 110 operates Hook functions based on such queue sequence shown in FIG. 9 at S603 (FIG. 6).

Each entry having a Hook function includes information of "address of Hook function" of each entry, "address of parameter" of each entry, "identifier" of each entry, "address of next Hook function," and "address of previous Hook function" as shown in FIG. 9.

The address of Hook function is an address on the RAM 12 that stores the Hook function set for each one of entries. The address of parameter is an address of parameter stored in the RAM 12, which is to be used by the Hook function set for each one of entries.

The identifier is information used for correlating a Hook function set for each entry, and each driver of each device. By referring the identifier, it can identify which driver uses which Hook function. In the second example embodiment, by referring the identifier, the activation sequence of Hook functions can be determined.

The address of next Hook function included in one entry indicates an address of Hook function included in another entry that is located right after the Hook function of such one entry, and such Hook function included in another entry is supposed to be activated after activating the Hook function included in such one entry.

The address of previous Hook function included in one entry indicates an address of Hook function included in another entry that is located just before the Hook function of such one entry, and such Hook function included in another entry is supposed to be activated before activating the Hook function included in such one entry.

Figure 10:
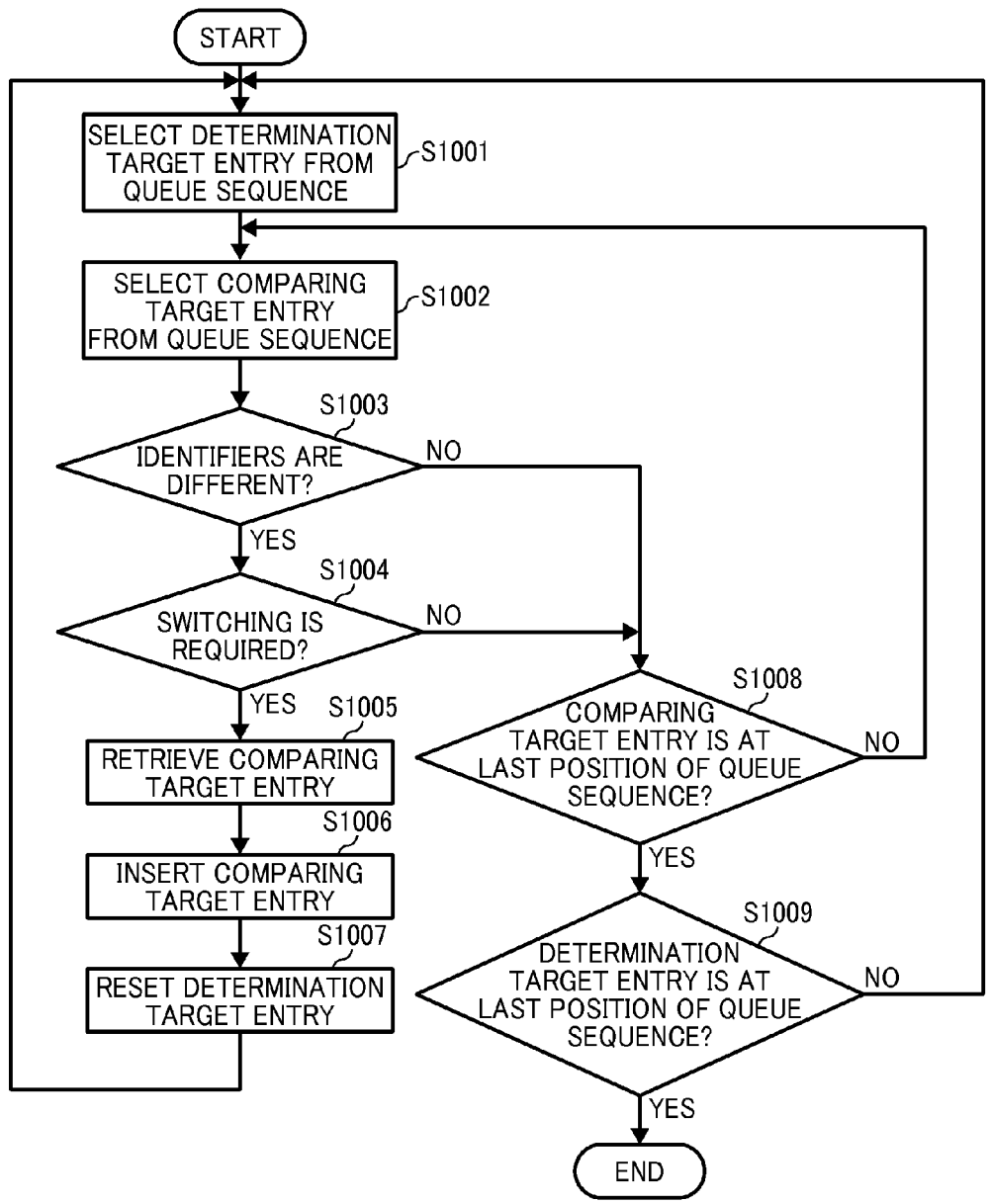
FIG. 10 shows a flowchart of steps of operation of changing an activation sequence of Hook functions according to another example embodiment.

In second example embodiment, when the system call module 113 activates the Hook function at S303 (FIG. 3), the CPU 110 may change the queue sequence of entries, which is the activation sequence of Hook functions based on the entry information shown in FIG. 9 and the activation priority information of devices. FIG. 10 shows a flowchart of process of changing the activation sequence of Hook functions according to an second example embodiment.

As shown in FIG. 10, the CPU 110 selects a determination target entry based on a current queue sequence of Hook functions (S1001). A Hook function in the queue sequence can be used as a cue for conducting a following processing. Further, the CPU 110 selects a comparing target entry information based on the same current queue sequence of Hook functions (S1002) so that an activation sequence between the determination target entry and the comparing target entry is compared. Upon selecting two entries having corresponding Hook functions, the CPU 10 compares two identifiers corresponding to the Hook functions (S1003). If the two identifiers are the same one (S1003: NO), it means the same Hook function, and thereby the activation sequence is not required to be determined, and the process proceeds to the next step.

In contrast, if the compared two identifiers are different (S1003: YES), the CPU 110 determines whether switching of activation sequence of the two identifiers is required (S1004). At S1004, the CPU 110 refers an activation priority table shown in FIG. 11. Such activation priority table correlates identifiers of devices, corresponding to each specific driver that uses specific Hook function, and an activation priority order of the devices. By referring the activation priority table, the CPU 110 determines whether the switching of sequence of two identifiers is required based on the identifier of the determination target entry and the identifier of the comparing target entry. The activation priority table (FIG. 11) is included, for example, as a part of information configuring the system call module 113. Further, the activation priority table can be stored in a storage such as a hard disk drive (HDD) to which the system call module 113 refers information.

If the CPU 110 determines that the switching of sequence of two identifiers is not required (S1004: NO), proceed to the next step S1008 similar to when the identifiers are identified as the same one at S1003.

In contrast, if the CPU 110 determines that the switching of sequence of two identifiers is required (S1004: YES), the CPU 110 retrieves the selected comparing target entry from the queue sequence (S1005). Then, for example, the CPU 110 may insert the retrieved comparing target entry just before the selected determination target entry (S1006), by which the queue sequence of entries can be switched. The details of S1005 and S1006 will be described later.

Upon completing step S1006, the CPU 110 resets the queue sequence of entries, and repeats the process from S1001 using an entry positioned at the front of queue sequence of entries as a determination target entry again (S1007).

If the identifiers are determined as the same one at S1003, or if it is determined that the switching of sequence of compared two identifiers is not required at S1004, the CPU 110 determines whether the selected comparing target entry is at the last position of queue sequence (S1008). If the selected comparing target entry is not at the last position of queue sequence (S1008: NO), the process returns to S1002, and the next entry is selected as a comparing target entry to repeat the process.

If the selected comparing target entry is at the last position of queue sequence (S1008: YES), the CPU 110 determines whether the selected determination target entry is at the last position of queue sequence (S1009). If the selected determination target entry is not at the last position of queue sequence (S1009: NO), the process returns to S1001 and the next entry is selected as a determination target entry to repeat the process. Further, if the selected determination target entry is at the last position of queue sequence (S1009: YES), the queue sequence of entries having Hook functions is set in line with the order defined in the activation priority table (FIG. 11), and then the process ends.

A description is given of step S1005 of FIG. 10 with reference to FIGS. 12 and 9. Among three entries shown in FIG. 9, for example, the first entry (most left side in FIG. 9) is used as a determination target entry, and the second entry (middle in FIG. 9) is used as a comparing target entry. It should be noted that each entry can be used as a determination target entry or a comparing target entry as required, and the terms of determination target entry and comparing target entry are used for the purpose of description.

As shown in FIG. 12, the CPU 10 determines whether the address of previous Hook function included in the selected comparing target entry is zero (0). In other words, the CPU 10 determines whether the address of previous Hook function included in the selected comparing target entry is other than zero (0). With such process, the CPU 10 can determine whether the selected comparing target entry is at the most front position of the queue sequence (S1201).

If the CPU 10 determines that the address of previous Hook function is other than zero (i.e., not 0), which means the comparing target entry is not at the most front position of the entry sequence (S1201: YES), the address of previous Hook function included in the comparing target entry designates one entry located just before the comparing target entry. Then, the address of next Hook function included in such one entry, located just before the comparing target entry, is overwritten with the address of next Hook function included in the comparing target entry (S1202).

If the CPU 10 determines that the address of previous Hook function included in the comparing target entry is zero (0) or upon completing the process at S1202, the CPU 110 determines whether the address of next Hook function included in the selected comparing target entry is zero (0). In other words, the CPU 10 determines whether the address of next Hook function included in the selected comparing target entry is other than zero (0). With such process, the CPU 110 determines whether the selected comparing target entry is at the last position of the queue sequence (S1203).

If the CPU 10 determines that the address of next Hook function is not zero (0), which means the selected comparing target entry is not at the last position of the queue sequence (S1203: YES), the address of next Hook function included in the comparing target entry designates one entry located right after the comparing target entry. Then, the address of previous Hook function included in such one entry, located right after the comparing target entry, is overwritten with the address of previous Hook function included in the comparing target entry (S1204).

Figure 13:
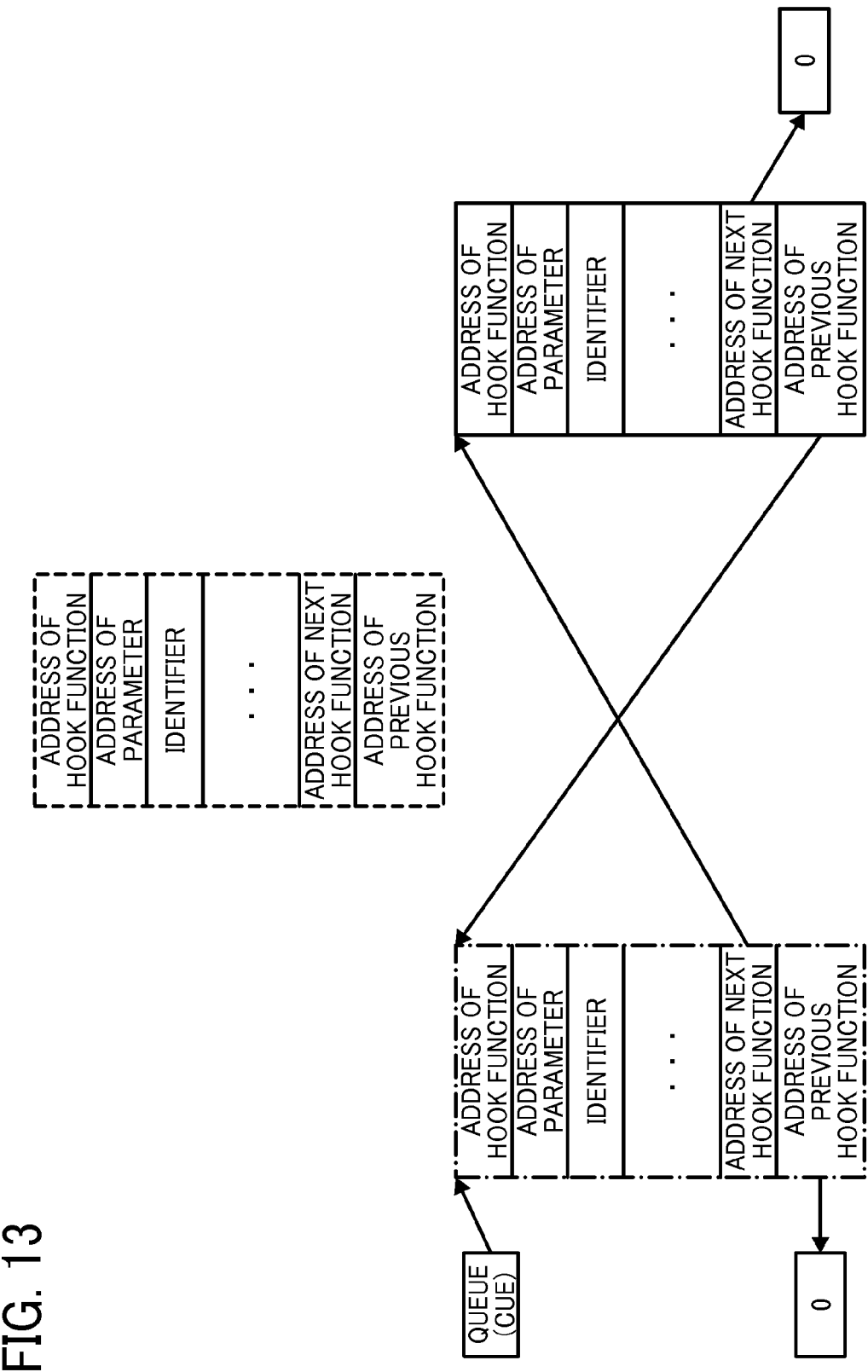
FIG. 13 schematically shows a condition that the comparing target entry is retrieved from queue sequence of Hook functions according to another example embodiment.

By conducting the process of FIG. 12, the queue sequence of entries shown in FIG. 9 can be changed to the queue sequence of entries shown in FIG. 13. In FIG. 13, a dashed line shows the determination target entry, and a dotted line shows the comparing target entry. Specifically, by conducting the process of FIG. 12, the entries disposed before and after the comparing target entry (see FIG. 9) can be linked with each other (see FIG. 13), and the comparing target entry is retrieved from the queue sequence as shown in FIG. 13. If the CPU 110 determines that the address of next Hook function included in the comparing target entry is zero (S1203: NO) or upon completing the process at S1204, the CPU 110 ends the process.

Figure 14:
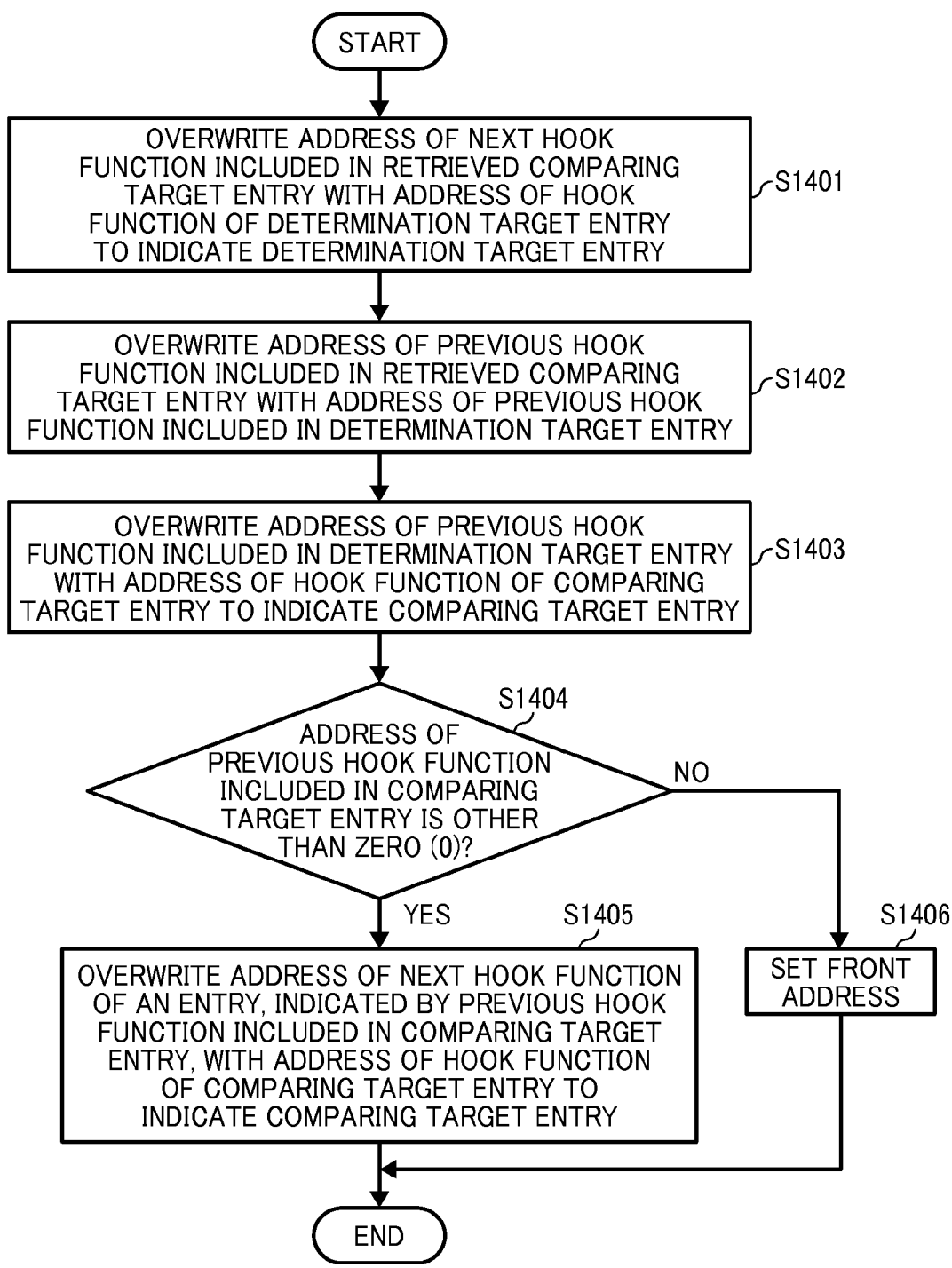
FIG. 14 shows a flowchart of steps of inserting the comparing target entry in queue sequence of Hook functions according to another example embodiment.

A description is given of step S1006 of FIG. 10 with reference to FIGS. 14 and 13. As above mentioned, among three entries shown in FIG. 9, the first entry (most left side in FIG. 9) is used as the determination target entry, and the second entry (middle in FIG. 9) is used as the comparing target entry, and by conducting the process shown in FIG. 12. The process shown in FIG. 14 starts when the condition of FIG. 13 is set.

To indicate one entry as a selected determination target entry with respect to the retrieved comparing target entry, as shown in FIG. 14, the CPU 110 overwrites the address of next Hook function included in the retrieved comparing target entry with the address of Hook function of the selected determination target entry, by which the address of next Hook function included in the retrieved comparing target entry indicates the selected determination target entry (S1401).

Then, the CPU 110 overwrites the address of previous Hook function included in the retrieved comparing target entry with the address of previous Hook function included in the selected determination target entry (S 1402).

Further, the CPU 110 overwrites the address of previous Hook function included in the determination target entry with the address of Hook function of the comparing target entry (S1403).

Then, the CPU 110 determines whether the address of previous Hook function included in the retrieved comparing target entry, overwritten at S1402, is zero (0), in which the CPU 110 determines whether an inserting position of the retrieved comparing target entry is at the most front position of the queue sequence (S1404).

If the CPU 110 determines that the inserting position of the retrieved comparing target entry is the most front position of the queue sequence (S1404: NO), the most front address of the queue sequence is set so that the comparing target entry is processed at first (S1406).

In contrast, if the CPU 110 determines that the inserting position of the retrieved comparing target entry is not at the most front position of the queue sequence (S1404: YES), it means that one entry, indicated by the address of previous Hook function including in the comparing target entry overwritten at S1402, exists before the comparing target entry. The CPU 110 overwrites the address of next Hook function included in such one entry, existing before the comparing target entry, with the address of Hook function of the comparing target entry (S1405) so that the comparing target entry is positioned next to such one entry, and then the process ends.

Figure 15:
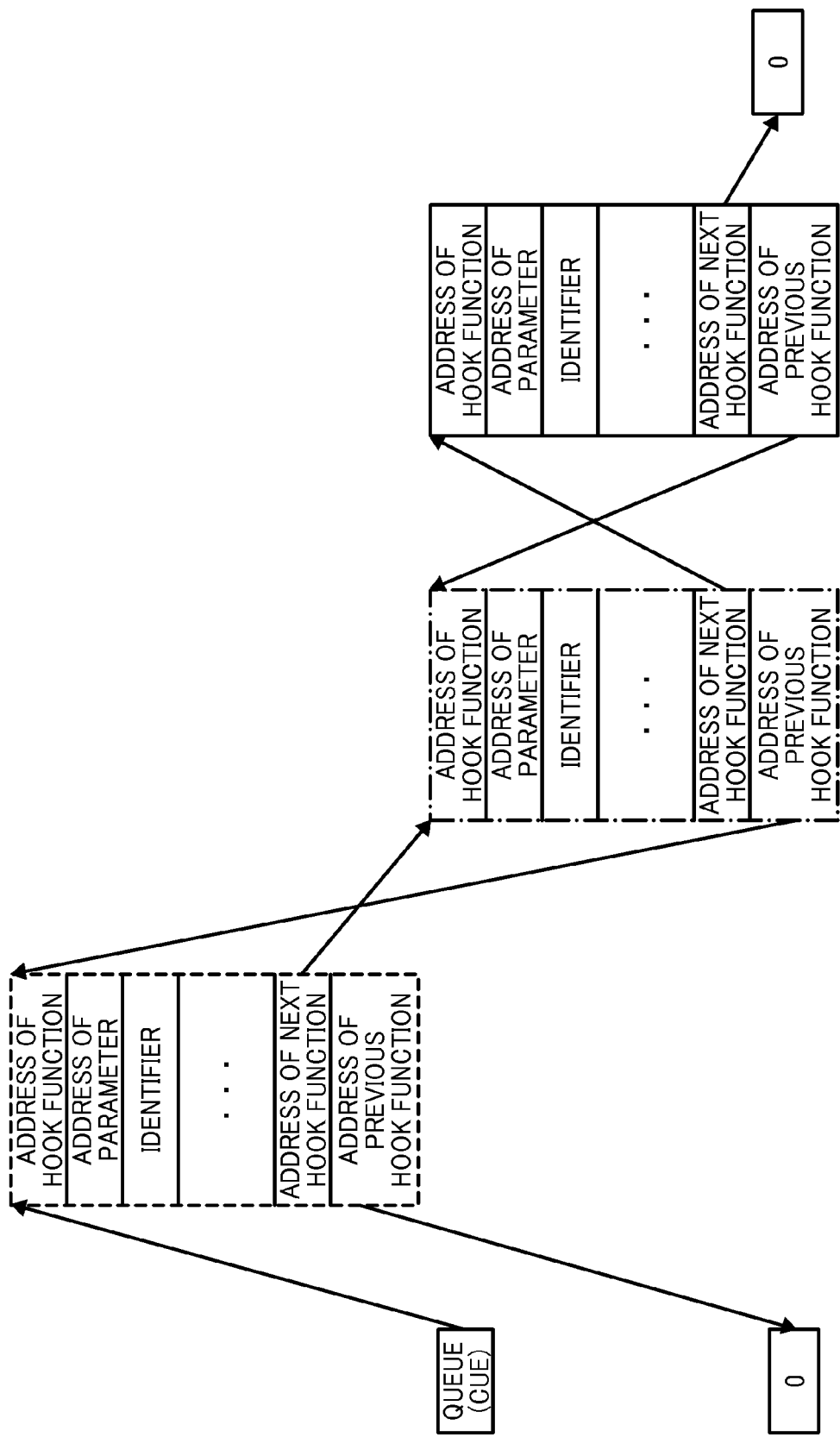
FIG. 15 schematically shows a condition that the comparing target entry is inserted in queue sequence of Hook functions according to another example embodiment.

In an example case shown in FIG. 13, at the determination step S1404, the address of previous Hook function included in the comparing target entry is determined as zero, and the process proceeds to S1406. By conducting the process at S1406, the queue sequence shown in FIG. 13 can be changed to the queue sequence shown in FIG. 15. By repeating such processing, activation sequence of Hook functions can be changed and completed according to the second example embodiment.

In the above described power-save control, when returning from the power-save mode, the CPU 110 function-able as the system call module 113 can change the access sequence of Hook functions based on the activation priority information (FIG. 11) indicating the activation priority of devices so that a plurality of connected-devices can be returned to their operations without operational problems. Specifically, when activating the Hook functions used for reading the driver context, which is conducted when restoring the driver context, the access sequence of Hook functions can be changed based on the activation priority information (FIG. 11), by which operational problems caused by devices activated by irregular operation sequence can be avoided.

In the above described example embodiments, the queue sequence of entries having Hook functions is switched before step S303 (FIG. 3), which means before shifting to the power-save mode. Because the information processing functions is operated at the normal mode before shifting to the power-save mode, the switching of the entries in the queue sequence can be conducted easily before step S303.

Further, the switching of entries for the queue sequence can be used as an effective process when conducting step S603 (FIG. 6) in which the operation of apparatus returns from the power-save mode. Specifically, after restoring the CPU context at step S602, the switching of entries for the queue sequence can be conducted before step S603.

In the above described power-save control, the power supply to a main storage unit can be continued while the power supply to a primary computing unit is stopped, and such power-save control can be applied to any information processing apparatus having any types of architecture.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a Wireless Application Protocol (WAP) or 3G-compliant phone) and so on. Since the present invention can be implemented as software, each and every aspect of the present invention thus encompasses computer software implementable on a programmable device.

The computer software can be provided to the programmable device using any storage medium or carrier medium for storing processor readable code such as a flexible disk, a compact disk read only memory (CD-ROM), a digital versatile disk read only memory (DVD-ROM), DVD recording only/rewritable (DVD-R/RW), electrically erasable and programmable read only memory (EEPROM), erasable programmable read only memory (EPROM), a memory card or stick such as USB memory, a memory chip, a mini disk (MD), a magneto optical disc (MO), magnetic tape, a hard disk in a server, a solid state memory device or the like, but not limited these.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

In the above-described example embodiment, a computer can be used with a computer-readable program, described by object-oriented programming languages such as C++, Java (registered trademark), JavaScript (registered trademark), Perl, Ruby, or legacy programming languages such as machine language, assembler language to control functional units used for the apparatus or system. For example, a particular computer (e.g., personal computer, work station) may control an information processing apparatus or an image processing apparatus such as image forming apparatus using a computer-readable program, which can execute the above-described processes or steps. In the above described embodiments, at least one or more of the units of apparatus can be implemented in hardware or as a combination of hardware/software combination. In example embodiment, processing units, computing units, or controllers can be configured with using various types of processors, circuits, or the like such as a programmed processor, a circuit, an application specific integrated circuit (ASIC), used singly or in combination.

Numerous additional modifications and variations are possible in light of the above teachings. It is therefore to be understood that within the scope of the appended claims, the disclosure of the present invention may be practiced otherwise than as specifically described herein. For example, elements and/or features of different examples and illustrative embodiments may be combined each other and/or substituted for each other within the scope of this disclosure and appended claims.

What is claimed is:

1. An information processing apparatus comprising:
a main storage device; and
at least one primary processor configured to,
supply power to the main storage device while stopping power supply to the at least one primary processor when a power-save mode is set for the information processing apparatus,
store operation status information indicating operation status of the at least one primary processor in the main storage device when shifting to the power-save mode,
store storing-destination information indicating a storage area of the operation status information in the main storage device to a secondary storage device,
stop power supply to the at least one primary processor after storing the operation status information and the storing-destination information,
confirm return operation identification information set by at least one secondary processor, upon detecting a return-initiating event for returning from the power-save mode, and conduct an initialization process of the at least one primary processor after power supply to the at least one primary processor is resumed,
obtain first present time information when shifting to the power-save mode, and store the first present time information in the main storing device or the secondary storing device, and
obtain second present time information when the operation status information is read out and the at least one primary processor is restored,
compute an elapsed time between the first present time and the second present time,
determine completion status information regarding a plurality of timer processings, and
based on the results of the determination, use the computed elapsed time for the uncompleted timer processing of the plurality of timer processings, and
read out the operation status information stored in the main storage device based on the storing-destination information stored in the secondary storage device when the return operation identification information is confirmed.

2. The information processing apparatus of claim 1, wherein the at least one primary processor is further configured to:
store the storing-destination information, and operation status designation information indicating a storage area of operation restoring information stored in the main storage device to the secondary storage device; when the return operation identification information is confirmed, the at least one primary processor is configured to access the main storage device by referring to the operation status designation information.

3. The information processing apparatus of claim 1, wherein the at least one primary processor is further configured to: store device operation status information indicating an operation status of a device controlled by the at least one primary processor to the main storage device when a mode shifts to the power-save mode; and
read out the device operation status information stored in the main storage device after the operation status information is read and then the primary computing unit is restored.

4. The information processing apparatus of claim 3, wherein the at least one primary processor is further configured to:
store device operation status designation information indicating an address of device operation status restoring information used for functioning the at least one primary processor in a storage area within the at least one primary processor when storing the operation status information;
wherein the operation status information includes information of the address of the device operation status restoring information; and
wherein after reading the operation status information and then restoring the at least one primary processor, the at least one primary processor is configured to access the main storage device by referring to the device operation status designation information stored in the storage area within the at least one primary processor.

5. The information processing apparatus of claim 4, wherein the device operation status restoring information used for functioning the at least one primary processor is prepared for each one of a plurality of devices; and
wherein the at least one primary processor is configured to change a sequence of accessing to the plurality of device operation status restoring information by the at least one primary processor based on information of priority order set for the plurality of devices when restoring device operation status of the plurality of devices.

6. The information processing apparatus of claim 1, wherein the at least one primary processor is further configured:
confirm the return operation identification information set at a port of an interface of the at least one primary processor and at a port of an interface of the at least one secondary processor, where both interfaces are used for communicating information between the at least one primary processor and the at least one secondary processor.

7. An information processing system, comprising:
a main system corresponding to the information processing apparatus of claim 1; and
a sub-system corresponding to a second information processing apparatus having the at least one secondary processor for controlling the second information processing apparatus, wherein the at least one secondary processor is configured to,
detect the return-initiating event for returning from the power-save mode,
detect the return-initiating event for returning from the power-save mode; and
conduct power supply to the at least one primary processor upon setting the return operation identification information after the return-initiating event is detected.

8. A method of power-save control for an information processing apparatus having a main storage device and at least one primary processor the information processing apparatus shift-able to a power-save mode continuing power supply to the main storage device while power supply to the at least one primary processor, the method comprising:

storing operation status information indicating operation status of the at least one primary processor in the main storage device when shifting to the power-save mode;

storing storing-destination information indicating a storage area of the operation status information in the main storage device to a secondary storage device;

stopping power supply to the at least one primary processor after storing the operation status information and the storing-destination information;

confirming return operation identification information set by at least one secondary processor that detects a return-initiating event for returning from the power-save mode when conducting initialization process of the at least one primary processor after supplying power to the at least one primary processor;

obtaining first present time information when shifting to the power-save mode, and storing the first present time information in the main storage device or the secondary storage device;

obtaining second present time information when the operation status information is read out and the at least one primary processor is restored;

computing an elapsed time between the first present time and the second present time;

determining completion status information regarding a plurality of timer processings;

using the computed elapsed time for the uncompleted timer processing of the plurality of timer processings based on the results of the determination; and reading out the operation status information by referring the storing-destination information stored in the secondary storage device when the return operation identification information is confirmed.

9. A non-transitory computer-readable storage medium storing a program that, when executed by a computer, causes the computer to execute a method of power-save control for an information processing apparatus having a main storage device and at least one primary processor, the information processing apparatus shift-able to a power-save mode continuing power supply to the main storage device while stopping power supply to the at least one primary processor, the method comprising:

storing operation status information indicating operation status of the at least one primary processor in the main storage device when shifting to the power-save mode;

storing storing-destination information indicating a storage area of the operation status information in the main storage device to a secondary storage device;

stopping power supply to the at least one primary processor after storing the operation status information and the storing-destination information;

confirming return operation identification information set by at least one secondary processor that detects a return-initiating event for returning from the power-save mode when conducting initialization process of the at least one primary processor after supplying power to the at least one primary processor;

obtaining first present time information when shifting to the power-save mode, and storing the first present time information in the main storage device or the secondary storage device;

obtaining second present time information when the operation status information is read out and the at least one primary processor is restored;

computing an elapsed time between the first present time and the second present time;

determining completion status information regarding a plurality of timer processings;

using the computed elapsed time for the uncompleted timer processing of the plurality of timer processings based on the results of the determination; and reading out the operation status information by referring the storing-destination information stored in the secondary storage device when the return operation identification information is confirmed.

10. The method of claim 8, further comprising:

storing the storing-destination information and operation status designation information indicating a storage area of operation restoring information stored in the main storage device to the secondary storage device; and when the return operation identification information is confirmed, using the at least one primary processor to access the main storage device by referring to the operation status designation information.

11. The method of claim 8, further comprising:

storing device operation status information indicating an operation status of a device controlled by the at least one primary processor to the main storage device when a mode shifts to the power-save mode; and reading out the device operation status information stored in the main storage device after the operation status information is read and then the primary computing unit is restored.

12. The method of claim 11, further comprising:

storing device operation status designation information indicating an address of device operation status restoring information used for functioning the at least one primary processor in a storage area within the at least one primary processor when storing the operation status information;

wherein the operation status information includes information of the address of the device operation status restoring information; and wherein after reading the operation status information and then restoring the at least one primary processor, using the at least one primary processor to access the main storage device by referring to the device operation status designation information stored in the storage area within the at least one primary processor.

13. The method of claim 12, further comprising:

changing a sequence of accessing to the plurality of device operation status restoring information by the at least one primary processor based on information of priority order set for the plurality of devices when restoring device operation status of the plurality of devices; and the device operation status restoring information used for functioning the at least one primary processor is prepared for each one of the plurality of devices.

14. The method of claim 8, further comprising:

confirming the return operation identification information set at a port of an interface of the at least one primary processor and at a port of an interface of the at least one secondary processor, wherein both interfaces are used for communicating information between the at least one primary processor and the at least one secondary processor.

15. The non-transitory computer-readable storage medium of claim 9, the method further comprising:

storing the storing-destination information and operation status designation information indicating a storage area of operation restoring information stored in the main storage device to the secondary storage device; and when the return operation identification information is confirmed, using the at least one primary processor to access the main storage device by referring to the operation status designation information.

16. The non-transitory computer-readable storage medium of claim 9, the method further comprising:
   storing device operation status information indicating an operation status of a device controlled by the at least one primary processor to the main storage device when a mode shifts to the power-save mode; and
   reading out the device operation status information stored in the main storage device after the operation status information is read and then the primary computing unit is restored.

17. The non-transitory computer-readable storage medium of claim 16, the method further comprising:
   storing device operation status designation information indicating an address of device operation status restoring information used for functioning the at least one primary processor in a storage area within the at least one primary processor when storing the operation status information;
   wherein the operation status information includes information of the address of the device operation status restoring information; and
   wherein after reading the operation status information and then restoring the at least one primary processor, using the at least one primary processor to access the main storage device by referring to the device operation status designation information stored in the storage area within the at least one primary processor.

18. The non-transitory computer-readable storage medium of claim 17, the method further comprising:
   changing a sequence of accessing to the plurality of device operation status restoring information by the at least one primary processor based on information of priority order set for the plurality of devices when restoring device operation status of the plurality of devices; and
   the device operation status restoring information used for functioning the at least one primary processor is prepared for each one of the plurality of devices.

19. The non-transitory computer-readable storage medium of claim 9, the method further comprising:
   confirming the return operation identification information set at a port of an interface of the at least one primary processor and at a port of an interface of the at least one secondary processor, wherein both interfaces are used for communicating information between the at least one primary processor and the at least one secondary processor.

* * * * *